United States Patent
Keutmann et al.

(10) Patent No.: US 7,099,675 B2
(45) Date of Patent: Aug. 29, 2006

(54) LOCATION UPDATE PROCEDURE WHEN ROAMING FROM A FIRST COMMUNICATION SERVICE DOMAIN TO A SECOND COMMUNICATIONS SERVICE DOMAIN

(75) Inventors: Heinz-Peter Keutmann, Eschweiler (DE); Peter Kobriger, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 10/468,066

(22) PCT Filed: Feb. 23, 2002

(86) PCT No.: PCT/EP02/01936

§ 371 (c)(1),
(2), (4) Date: Aug. 14, 2003

(87) PCT Pub. No.: WO02/069660

PCT Pub. Date: Sep. 6, 2002

(65) Prior Publication Data

US 2004/0072578 A1    Apr. 15, 2004

(30) Foreign Application Priority Data

Feb. 23, 2001    (EP) ................................. 01104631

(51) Int. Cl.
*H04Q 7/20*    (2006.01)

(52) U.S. Cl. .................. 455/456.1; 455/435; 455/433; 455/404.2

(58) Field of Classification Search ............. 455/456.1, 455/435.1, 433, 404.2, 432, 565
See application file for complete search history.

(56) References Cited

U.S. PATENT DOCUMENTS

| | | | |
|---|---|---|---|
| 1,921 A * | 12/1840 | Fletcher et al. ............... | 105/37 |
| 5,537,467 A * | 7/1996 | Cheng et al. .......... | 379/211.02 |
| 5,862,480 A * | 1/1999 | Wild et al. ................ | 455/432.2 |
| 6,081,731 A * | 6/2000 | Boltz et al. .................. | 455/565 |
| 6,230,017 B1 * | 5/2001 | Andersson et al. ....... | 455/456.6 |
| 6,643,511 B1 * | 11/2003 | Rune et al. .................. | 455/433 |
| 6,671,507 B1 * | 12/2003 | Vinck .......................... | 455/411 |
| 6,731,932 B1 * | 5/2004 | Rune et al. .............. | 455/432.1 |

(Continued)

FOREIGN PATENT DOCUMENTS

EP    1059822 A    12/2000

(Continued)

OTHER PUBLICATIONS

TS 24.008 V3.2.1 (Jan. 2000), 3$^{rd}$ General Partnership Project; Universal Mobile Telecommunications System; Mobile Radio Interface layer 3 specifications, Core Network Protocols—Stage 3 (TS 24.008 version 3.2.1).

*Primary Examiner*—CongVan Tran

(57) ABSTRACT

The invention relates to a location update procedure in a mobile communications system (150) having at least one first communications service domain (100) and at least one second communications service domain (110). The mobile subscriber (140) is allowed to register in said first communications service domain. A location update request is received at a network element (170) of the communications system, and a subscription restriction information is received at this network element, said subscription restriction information indicating, whether a roaming restriction for a roaming into the second communications service domain applies for the mobile subscriber. The subscription restriction information is evaluated, and the location update procedure is performed depending on the evaluation. The invention relates further to a corresponding network element (170), home subscriber data register (160), user equipment (140) and computer program.

18 Claims, 4 Drawing Sheets

| U.S. PATENT DOCUMENTS | | | | | |
|---|---|---|---|---|---|
| 6,771,964 B1 * | 8/2004 | Einola et al. ............... 455/437 | WO | WO9742781 A | 11/1997 |
| | | | WO | WO0225981 A | 3/2002 |

FOREIGN PATENT DOCUMENTS

| EP | 1065904 A | 1/2001 |
|---|---|---|

\* cited by examiner

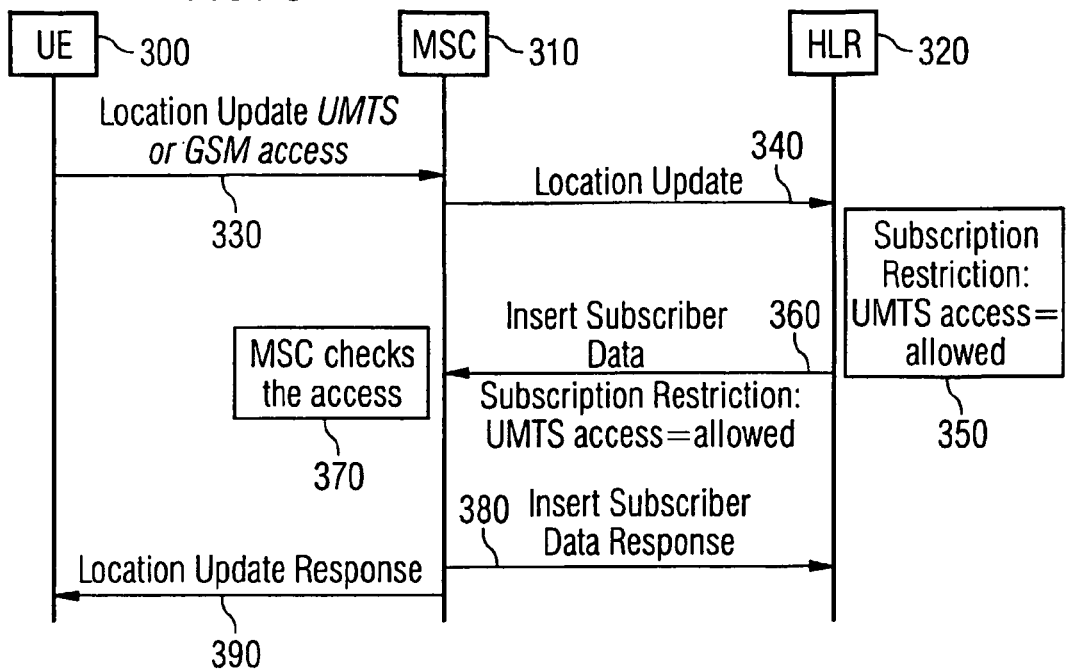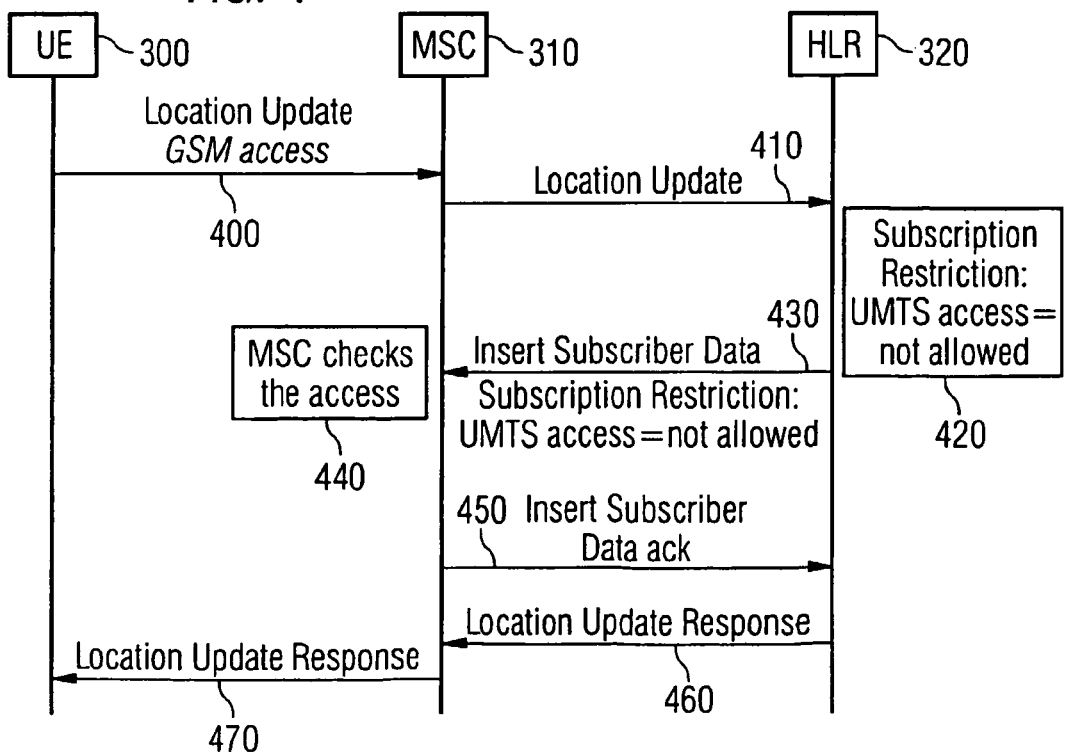

FIG. 5 

FIG. 6 a) 1 bit

| SRP | |
|---|---|
| 0 | UMTS not allowed |
| 1 | UMTS allowed | or

| SRP | |
|---|---|
| 0 | GSM not allowed |
| 1 | GSM allowed | b) 2 bit

| SRP | HPLMN | VPLMN |
|---|---|---|
| 00 | GSM | GSM |
| 01 | GSM | UMTS |
| 10 | UMTS | GSM |
| 11 | UMTS | UMTS | c) 4 bit

| SRP | | | | Meaning |
|---|---|---|---|---|
| 1st bit ≙ UMTS in HPLMN | 2nd bit ≙ GSM in HPLMN | 3rd bit ≙ UMTS in VPLMN | 4th bit ≙ GSM in VPLMN | |
| 0 | 1 | 0 | 0 | GSM; only HPLMN |
| 0 | 1 | 0 | 1 | GSM only |
| 0 | 1 | 1 | 1 | GSM only and UMTS abroad |
| 1 | 1 | 0 | 1 | UMTS/GSM at home GSM abroad only |
| 1 | 1 | 1 | 1 | total roaming α) default=GSM preferred β) default=UMTS preferred γ) default=no preference |
| 1 | 0 | 0 | 0 | UMTS; only HPLMN |
| 1 | 0 | 1 | 0 | UMTS only |
| 1 | 0 | 1 | 1 | UMTS at home GSM/UMTS abroad |

FIG. 6
| | | 6 bit |
|---|---|---|
| | | Frequency area |
| SRP | Bit 1 | 450 MHz |
| | Bit 2 | 800 MHz |
| | Bit 3 | 900 MHz |
| | Bit 4 | 1800 MHz |
| | Bit 5 | 1900 MHz |
| | Bit 6 | 2400 MHz |
d)
Bit value
'1'=allowed
'0'=rejected
FIG. 7
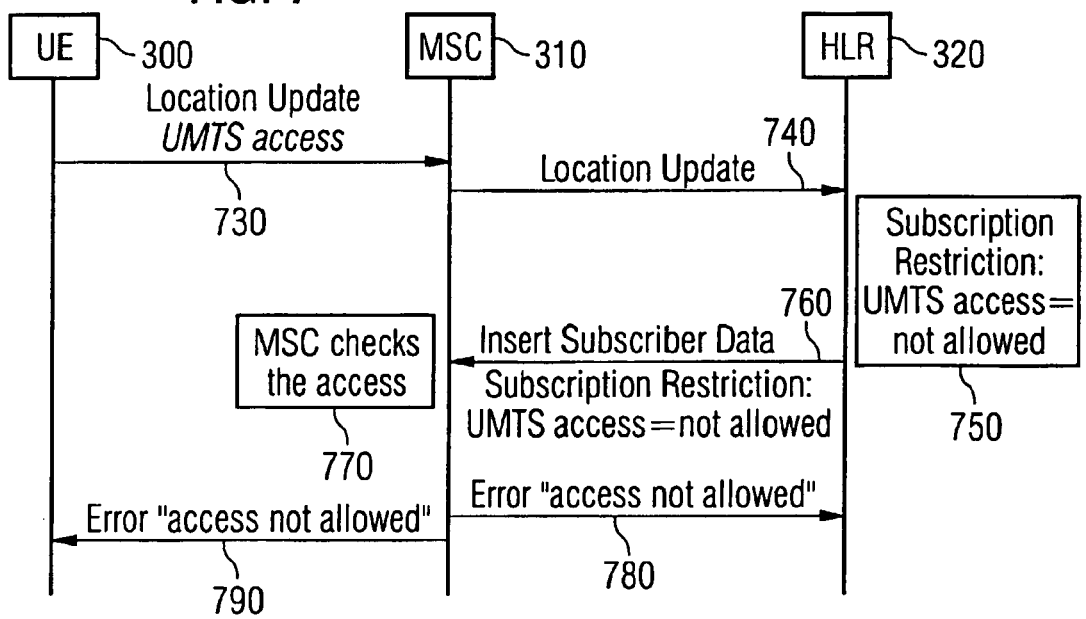
FIG. 8
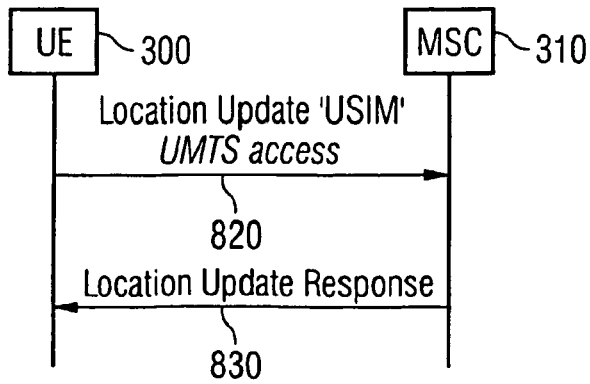

LOCATION UPDATE PROCEDURE WHEN ROAMING FROM A FIRST COMMUNICATION SERVICE DOMAIN TO A SECOND COMMUNICATIONS SERVICE DOMAIN

FIELD OF THE INVENTION

The invention addresses the field of mobile communications. It relates to a method, device and computer program for performing a location update procedure for a mobile subscriber. It relates in particular to a roaming of a mobile subscriber from a $2^{nd}$ generation system domain like a Global System for Mobile Communication GSM domain to a $3^{rd}$ generation system domain like a Universal Mobile Telecommunication System UMTS domain, or vice versa.

BACKGROUND OF THE INVENTION

In mobile communications systems, a location update procedure is performed to allow a roaming of a subscriber from one to another service domain. E.g., if a mobile subscriber, who is registered in a service domain of his Home Public Land Mobile Network HPLMN operator, leaves his home country and moves to a service domain operated by a Visited Public Land Mobile Network VPLMN operator, the location update procedure is performed to allow for the international roaming. Details about service accessibility can be found, e.g., in 3G TS 22.011 v.3.3.0, 3rd Generation Partnership Project; Technical Specification Group Services and System Aspects; Service accessibility (Release 1999).

The term 'roaming' describes as well a scenario, wherein the mobile subscriber has currently not accessed his HPLMN domain, e.g. because the terminal is at present switched off, but accesses while being located in a VPLMN domain the VPLMN domain by switching his terminal on.

For UMTS, it is planned to use GSM Subscriber Identity Modules SIMs in a UMTS mobile terminal to get access to service. However, the current standards for roaming in UMTS and GSM as well as the legal requirements set by individual national countries, differ with respect to roaming for the subscriber. UMTS subscribers will be entitled to national roaming, as it is foreseen that the UMTS networks initially consist of small islands only. To provide more frequent access to service, the subscriber shall have the possibility to register to networks on a national basis in addition to international roaming.

GSM subscribers are usually not entitled to national roaming. Nevertheless, the GSM subscriber using a dual mode, e.g. GSM-UMTS, mobile terminal shall be able to access both GSM and UMTS systems in his home country as well as abroad.

Currently, it is not possible to allow for a differentiated accessing of dedicated service domains according to the outlined roaming rules, as there is no means to distinguish GSM subscribers from UMTS subscribers. The reason is that for the 3GPP Release 99 and beyond, both GSM and UMTS apply the same security mechanisms as stated in 3G TS 33.102, v.3.6.0, 3rd Generation Partnership Project; Technical Specification Group Services and System Aspects; 3G Security; Security Architecture, clause 6.8.1.1.

Problems occur for roaming cases involving a Home Public Land Mobile Network HPLMN operator and a Visited Public Land Mobile Network VPLMN operator if both of them are running GSM and UMTS networks in the same country and are using the same Mobile Network Codes MNCs for their networks. Such a scenario is likely in particular in the early days of UMTS introduction when operators run their UMTS networks from an administration point of view as extensions of their existing GSM networks.

If a GSM subscriber being served by his HPLMN operator's UMTS network moves, he can get out of coverage of his HPLMN operator's UMTS network but in coverage of another UMTS operator's network. According to national roaming agreements for UMTS he is granted service by the visited UMTS network. If getting out of coverage of the visited UMTS network, he is served by the same network operator's GSM network. Although there might be no roaming agreement for GSM existing between the GSM networks, the GSM subscriber cannot be prevented from roaming to the foreign GSM network.

SUMMARY OF THE INVENTION

It is an object of the invention to provide a method, device and computer program for a differentiation of access entitlements of a mobile subscriber to dedicated service domains of a mobile communications system.

A mobile communications system has at least one first communications service domain, e.g. a GSM domain, and at least one second communications service domain, e.g. a UMTS domain. A mobile subscriber is allowed to access said first communications service domain, which is e.g. a service domain of his HPLMN operator. A location update request is received at a network element, preferably a Mobile Switching Centre MSC or a Serving GPRS Support Node SGSN, of the communications system. A skilled person understands easily that the network element can be any further network node or part of any further network node of the communications system. E.g., the inventive function can be performed as well in an HLR.

For performing a location update procedure for the mobile subscriber, a subscription restriction information is received at the network element. The subscription restriction information indicates, whether an access restriction for accessing the second communications service domain applies for the mobile subscriber. The subscription restriction information is evaluated at the network element, and the location update procedure is performed depending on the evaluation.

Advantageously, the provision of a subscription restriction information allows for a differentiated treatment of mobile subscribers using dual mode, e.g. GSM/UMTS, terminals with respect to roaming. Operators can design their UMTS networks according to island concepts for areas having a high population in an efficient way, while simultaneously providing in general a broad service coverage to their customers via GSM. Differentiated roaming agreements can be set with other operators. Individual roaming requirements given by national laws can easily be fulfilled. Furthermore, the mobile subscribers can benefit from dedicated roaming possibilities and access entitlements in terms of optimised service coverage.

Operators running both GSM and UMTS networks will be able to provide to their customers services allowing to distinguish between GSM, UMTS, as well as intersystem roaming services.

According to the invention, a home subscriber data register, e.g. a Home Location Register HLR is adapted to store a subscription restriction information assigned to stored data of a mobile subscriber. The subscription restriction information indicates at least one access restriction that applies to the mobile subscriber for accessing a communications service domain of a mobile communications system.

Advantageously, the HPLMN operator keeps by storing the subscription restriction information in his HLR control of the restrictions. Furthermore, easy administration and modification of the subscriber restrictions are possible. Advantageously, the operator can use the same Mobile Network Code MNC for both his GSM and UMTS portion of his PLMN, e.g. by simply storing an indicator in the network administration data belonging to the respective service areas giving the corresponding access type, e.g. GSM or UMTS.

A user equipment of a mobile subscriber is adapted to store a subscription restriction information that indicates at least one access restriction that applies to the mobile subscriber for accessing a communications service domain of a mobile communications system. The user equipment can be any terminal like a GSM-, GPRS- or UMTS-phone, -laptop or -adapter. The user equipment can comprise a Subscriber Identity Module SIM card that stores the subscription restriction information.

Advantageously, the storing of the subscription restriction information in the user equipment can reduce the administrative effort of the operator because a central database administering the restriction information is not needed. Furthermore, the subscription restriction information can easily be displayed to the mobile subscriber.

It should be noted that the signalling of the subscription restriction information can be performed by a network element, e.g. HLR, by a user equipment, or by both of them. Advantageously, an operator can decide for the latter case in particular if there are differences in the restriction information, which one of the signalling sources gets priority. Furthermore, the restriction information of the two signalling sources can be evaluated in a complementary way.

Furthermore, the invention can be realised by a computer program, which is loadable into the internal memory of a digital processing unit, comprising software code portions adapted to control the steps of the described methods, when the computer program is executed on the digital processing unit. Therefore, servers that are by means of the computer program adapted to perform the inventive method can easily represent network elements according to the present invention.

Preferred embodiments of the invention are described in the dependent claims.

A location update is performed if the evaluation of the subscription restriction information indicates that an accessing of the second communications service domain is allowed for the mobile subscriber.

A location update request is rejected if the subscription restriction information evaluation indicates that an accessing of the second communications service domain is not allowed for the mobile subscriber.

In a preferred embodiment, an error information is sent in response to the location update request if the request is rejected, said error information indicating an access restriction as a reason for the rejection. Therefore, redundant re-tries of a location update request that has already been rejected can be avoided.

In a further preferred embodiment, the subscription restriction information is received within the location update request sent from a user equipment of the mobile subscriber. Advantageously, the receiving network node can evaluate, whether a corresponding accessing and/ or roaming of the mobile subscriber is allowed, without requesting said information from a further network node, e.g. from an HLR. Therefore, signalling traffic can be avoided.

In another preferred embodiment, the subscriber data information is requested from a home subscriber data register, e.g. an HLR, and the subscription restriction information is received within subscriber data information sent from the home subscriber data register. Advantageously, there is no need to store the subscription restriction information in the user equipment. Instead, the information is under the control of the HPLMN operator. Advantageously, signalling traffic is minimised by using the transmission of subscriber data information, e.g. by a corresponding Mobile Application Part MAP message, which is performed for the purpose of location update, also for the transmission of the subscription restriction information.

In a further embodiment, the subscriber restriction information comprises an access network type restriction information indicating an access network type restriction. Access network types are e.g. GSM, GPRS, UMTS or Wireless LAN.

In another embodiment, the subscription restriction information comprises a frequency band restriction information indicating a frequency band restriction. Depending on the used radio access technique, mobile communications systems can use different frequency bands, also called frequency areas, to provide radio access. Preferably, frequency bands are symbolized by a significant frequency, e.g. 800 MHz, 1800 MHz, 1900 MHz (all GSM), and 2400 MHz (UMTS).

In a further embodiment, the subscription restriction information comprises a Public Land Mobile Network PLMN type restriction information indicating a PLMN restriction. PLMN types are e.g. a HPLMN or a VPLMN. Alternatively, individual operator identifiers can be PLMN types as well.

In another embodiment, the home subscriber data register HLR is adapted to send on request a subscriber data information comprising a subscription restriction information that applies to the mobile subscriber. Therefore, a network element like a MSC or SGSN can retrieve—based upon a location update request received from a user equipment—the corresponding subscription restriction information in order to evaluate whether the subscriber is entitled to the requested communications service domain access.

In a further embodiment, the user equipment is adapted to send a location update request comprising the subscription restriction information, if the user equipment determines a change of its location area.

In another preferred embodiment the computer program is stored on a computer readable medium like a CD-ROM, a floppy disc, optical disc or hard disk. Therefore, a good physical portability of the control software is provided, i.e. upgrades of network elements represented by servers can be performed in an easy way.

DETAILED DESCRIPTION

A subscription parameter can be present in both the subscriber data stored in the HLR as well as on the SIM or in the user equipment itself. It can be used for two different types of roaming services allowing network operators (HPLMN and VPLMN) to allow and reject access to their network. The serving MSC is able to determine the access type the subscriber used.

One type of roaming services refers to roaming restriction due to subscription restriction via the HPLMN. Preferably, a currently unused parameter "Subscription restriction" as described in 3G TS 23.008 v.3.5.0: 3rd Generation Partnership Project; Technical Specification Group Core Network; Organisation of subscriber data (Release 99), clause 2.4.10, is enhanced to cover possible scenarios. According to the invention, this parameter is downloaded to the visited MSC/VLR (VMSC) at location update. The VMSC grants or rejects access to a roaming subscriber depending on the settings of this parameter and the type of access the subscriber uses. Additionally, if access is denied, a specific error, i.e. error code, can be generated and sent to the mobile station of the subscriber, e.g. to trigger network reselection.

This approach can also be used to allow/reject GSM/UMTS roaming in the HPLMN.

Another type of roaming services refers to roaming restriction due to subscription restriction (VPLMN). The UMTS SIM (USIM) contains a parameter giving the same range as the one described in the above paragraph. Preferably, the parameter is introduced as a capability and configuration parameter (3G TS 21.111, v. 3.3.0: 3rd Generation Partnership Project; Technical Specification Group Terminals; USIM and IC Card Requirements, release 1999, clause 10.1). At location update, the VMSC checks the value of this parameter and grants/rejects access to a roaming subscriber depending on the settings of this parameter and the type of access the subscriber uses. If access is denied, a specific error can be generated and sent to the mobile station of the subscriber, e.g. to trigger network reselection.

In the following, the invention and its embodiments are described with reference to the figures.

Figure 1:
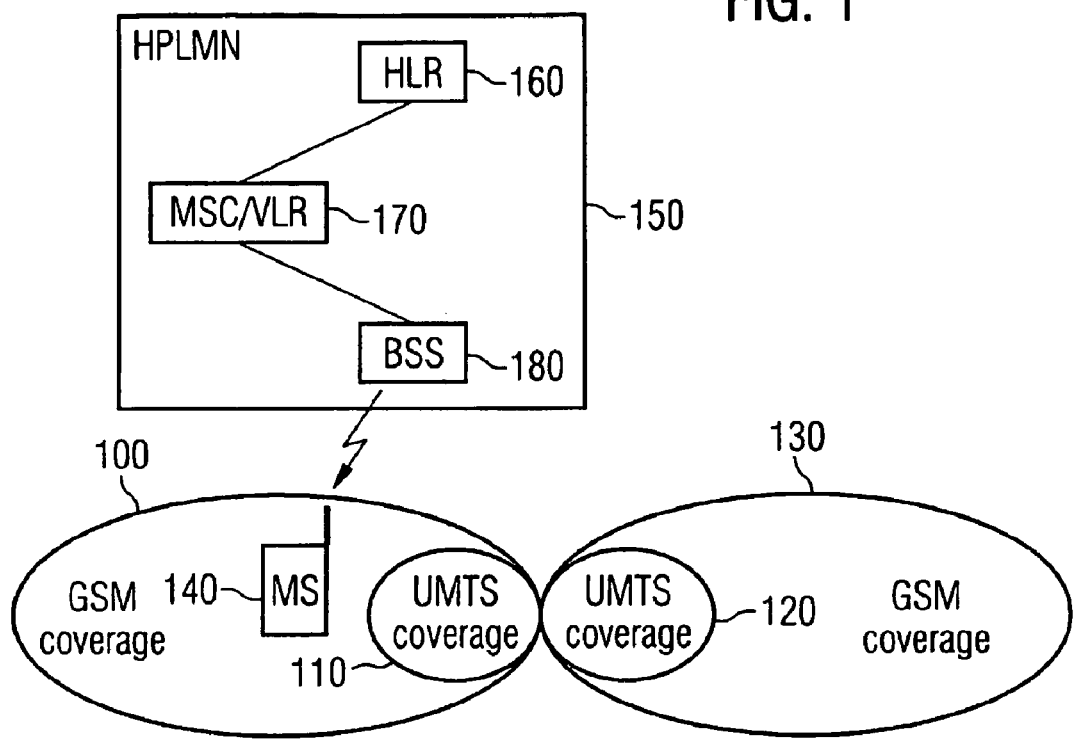
FIG. 1 a simplified HPLMN and its served communications service domains.

FIG. 1 shows simplified a mobile communications system 150 comprising a Home Location Register (HLR) 160 storing subscriber data of mobile subscribers, a Mobile Switching Centre/Visitor Location Register (MSC/VLR) 170 performing, e.g., switching tasks and by means of location updates registrations of mobile subscribers in communications service domains, and a Base Station System (BSS) 180 providing radio access to the mobile communications system 150. The mobile communications system 150 represents a Home Public Land Mobile Network (HPLMN) of an operator. The HLR 160 is connected to the MSC/VLR 170. The MSC/VLR 170 is connected to the BSS 180.

In alternative embodiments, the MSC/VLR can be a pooled network node. The VLR can be implemented by a separate network node. The BSS can be represented by a Radio Network Controller RNC. The MSC, or respectively the MSC/VLR can be a Serving GPRS Support Node SGSN.

The mobile communications system provides communications services in different coverage areas, i.e. communications service domains. There are communications service domains providing GSM coverage 100, 130. Other communications service domains provide UMTS coverage 110, 120. A user equipment (MS) 140, e.g. a mobile terminal, that is registered in such a domain communicates via the BSS 180 with the communications system 150.

The invention applies to both circuit-switched and/or packet switched domains. Furthermore, a skilled person can easily derive further appropriate communications service domain types, i.e. access network types, than GSM or UMTS, e.g. a Wireless Local Area Network Type (Wireless LAN) or a Bluetooth™ network type.

If a mobile subscriber using the MS 140 moves from one communications service domain to another, a location update procedure is performed in order to register the MS 140 for the purpose of service provisioning in the newly entered communications service domain. Technical compatibility of the MS 140 provided, it depends on subscription restrictions valid for the mobile subscriber, whether the MS 140 is served in the new domain, i.e. whether the MS 140 is allowed to access the new domain.

A location update procedure can be performed not only due to physical movement of the MS 140, but, e.g., as well for the purpose of initial registration of the MS 140 in the mobile communications system 150, if the MS is switched on.

Figure 2:
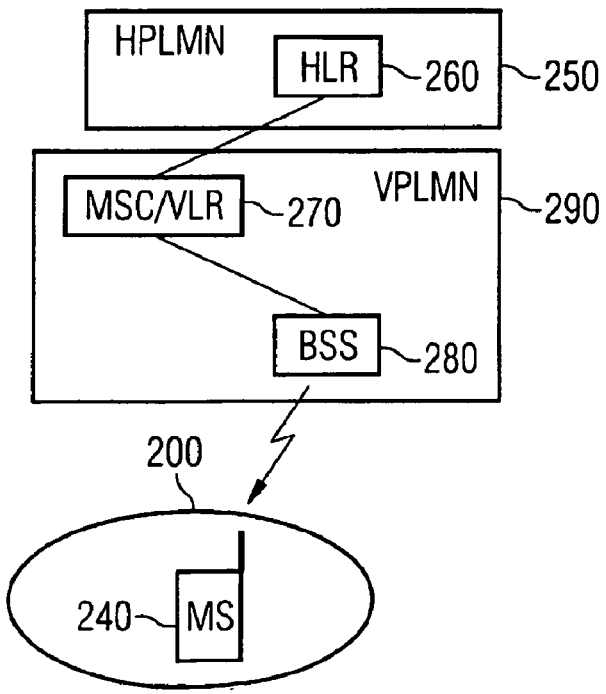
FIG. 2 a simplified HPLMN and VPLMN and a hybrid coverage communications service domain, FIG. 3 a message flow for a HPLMN-controlled location update procedure with allowed UMTS access, FIG. 4 a further message flow for a HPLMN-controlled location update procedure for a GSM subscriber accessing a GSM network, FIG. 5 a structure of a 'insert subscriber data' message, FIG. 6a a 1 bit embodiment for a subscription restriction parameter SRP, FIG. 6b a 2 bit embodiment for a SRP, FIG. 6c a 4 bit embodiment for a SRP, FIG. 6d a 6 bit embodiment for a SRP for multiband operation restriction FIG. 7 a further message flow for a HPLMN-controlled location update procedure for a GSM subscriber requesting access to a UMTS network, and FIG. 8 a further message flow for a user-equipment controlled location update procedure for UMTS access with UMTS SIM indication.

FIG. 2 shows simplified a mobile communications system comprising a HPLMN 250 and a Visited Public Land Mobile Network (VPLMN) 290. HPLMN and VPLMN can be operated by different operators. The HPLMN 250 comprises a HLR 260. The VPLMN 290 comprises a MSC/VLR 270 and a BSS 280. The MSC/VLR 270 is connected to the HLR 260 and the BSS 280. The VPLMN 290 serves a hybrid coverage communications service domain 200, i.e. within the domain 200 both GSM and UMTS communications services are provided. A MS 240 communicates via the BSS 280 with the mobile communications system.

Technical compatibility provided, a MS 240 that is registered by means of GSM in the mobile communications system can request a location update in order to change the access network type to UMTS, e.g. due to a trigger of an application that requires a higher bandwidth. On the other hand, a location update request is possible for the purpose of changing the registration from UMTS to GSM.

FIG. 3 shows a message flow for a HPLMN-controlled location update procedure with allowed UMTS access. A user equipment (UE) 300 sends a location update request message 330 (via a corresponding BSS or RNC, not shown) requesting UMTS or GSM access to a MSC 310 (or alternatively SGSN), which transmits a corresponding location update request message 340 to an HLR 320 that is located in the HPLMN. The HLR 320 determines, whether any subscription restrictions apply for the mobile subscriber. In the shown example, UMTS access is allowed 350. In response to the location update request 340, the HLR 320 sends an Insert Subscriber Data message 360 comprising an indication that UMTS access is allowed to the MSC 310. The MSC 310 checks the access 370 and registers the UE 300 in the requested UMTS domain, and it acknowledges the location update to the HLR 320 by sending a Insert Subscriber Data Response message 380. Furthermore, it acknowledges the performed location update by means of a Location Update Response 390 sent to the UE 300.

FIG. 4 shows a message flow for a HPLMN-controlled location update procedure for a GSM subscriber accessing a GSM network. A user equipment (UE) 300 of a GSM subscriber sends a location update request message 400 (via a corresponding BSS or RNC, not shown) requesting GSM access to a MSC 310 (or SGSN accordingly), which transmits a corresponding location update request message 410 to an HLR 320 that is located in the HPLMN. The HLR 320 determines, whether any subscription restrictions apply for the mobile subscriber. In the shown example, UMTS access is not allowed 420. In response to the location update request 410, the HLR 320 sends an Insert Subscriber Data message 430 to the MSC 310 indicating that UMTS access is not allowed. The MSC 310 checks the access 440 and registers the UE 300 in the requested GSM domain, and it acknowledges the location update to the HLR 320 by sending a Insert Subscriber Data Response message 450. After a Location update response message 460 is received from the HLR 320, the MSC 310 acknowledges the performed location update to the UE 300 by means of a Location Update Response 470.

FIG. 5 shows a structure of an Insert Subscriber Data message 500. It comprises subscriber data 510 and a subscriber restriction parameter 520, called as well subscription restriction parameter 520. Preferably, the Insert Subscriber Data message is a MAP message. Details about MAP messages can be found in 3G TS 29.002 v. 3.7.2, 3rd Generation Partnership Project; Technical Specification Group Core Network; Mobile Application Part (MAP) specification (release 99).

In an alternative embodiment of the invention, the SRP is requested and/or sent via separate messages each.

FIG. 6 illustrates in some examples the possible structures and values of the subscription restriction parameter SRP. Preferably, the SRP indicates an access network type restriction as shown in FIG. 6a by the values of an 1 bit SRP parameter. If the bit value is '0', UMTS access, i.e. an access to the UMTS access network, is not allowed. If the bit value is '1', UMTS access is allowed. In another embodiment, the SRP parameter value '0' means that GSM access is not allowed, while for a value '1' GSM access is permitted.

In the case of a location update acknowledgement message, e.g. Location Update Response message 390, 470 or Insert Subscriber Data 360, 430, the 1 bit SRP can easily be understood as an acknowledgement flag in response to a dedicated location update request, e.g. with SRP='1' having the meaning 'acknowledged' and SRP='0' having the meaning 'not acknowledged'.

Furthermore, the SRP parameter can easily cover more than two different access network types, e.g. by using the appropriate number of bits.

FIG. 6b shows a preferred embodiment of a 2 bit structure of the SRP. This structure allows for the differentiation of roaming restrictions in terms of access network types (GSM, UMTS) and network types (HPLMN, VPLMN). E.g., the SRP value '01' indicates that in the HPLMN GSM access is allowed, while the mobile subscriber is in the VPLMN entitled to UMTS access. In other words, the table indicates for HPLMN and VPLMN the allowed domains. In this way, an entry 'UMTS allowed' excludes GSM, i.e. GSM is not allowed. In a further embodiment, an entry 'UMTS allowed' includes the permission for GSM, i.e. includes 'GSM allowed'. Preferably, operators of HPLMN and VPLMN can agree in corresponding roaming agreements about such rules for interpretation of the SRP parameters.

FIG. 6c illustrates a 4 bit structure of the SRP. The first bit represents the entitlement for UMTS in the HPLMN, the second bit the entitlement to GSM in the HPLMN. The third bit refers to UMTS in VPLMN, the fourth bit to GSM in VPLMN. Preferably, the bit value '0' means 'not allowed', while the value '1' indicates 'allowed'. By using the scheme outlined in FIG. 6c, a mobile subscriber can be entitled to more than one access network type. In such a case, different rules can apply—e.g. dependent on operator agreements or the contract of the mobile subscriber with the HPLMN operator, or the current load situation in the corresponding network. Nevertheless, operators can set their preferences as default. E.g., if a SRP indicates by a value '1111' an entitlement to a total roaming, the default can be 'GSM preferred'. 'UMTS preferred' or 'no default'. It should be noted that apart from the exemplary values other possible values of the SRP not shown in the table can be valid restriction indications as well.

FIG. 6d shows an embodiment, wherein the SRP is used to indicate multiband operation restrictions that are valid for a mobile subscriber. Multiband operations refer to roaming between domains serving different frequency areas or frequency bands, e.g. the roaming of a subscriber from GSM 900 to GSM 1800.

The SRP of FIG. 6d has a 6 bit structure. Bit 1 refers to the frequency band 450 MHz, bit 2 refers to 800 MHz etc. Usually, the frequencies of 450 MHz to 1900 MHz refer to GSM systems, while the frequency area 2400 MHz is used for UMTS. Preferably, a bit value '1' indicates an entitlement for roaming into a communications service domain serving the given frequency area, while the value '0' indicates that a mobile subscriber is not allowed to register in such a domain.

Apart from the SRP value schemes as outlined in the FIGS. 6a to 6d, any combinations and derivations are possible both for SRP structure and values.

FIG. 7 shows a message flow for a HPLMN-controlled location update procedure, wherein a GSM subscriber requests access to a UMTS network. The user equipment (UE) 300 sends a location update request message 730 (via a corresponding BSS or RNC, not shown) to a MSC 310 (or alternatively SGSN) requesting UMTS access. The MSC 310 transmits a corresponding location update request message 740 to the HLR 320 that is located in the HPLMN. The HLR 320 determines that there is a subscription restriction for the mobile subscriber 750, i.e. that the mobile subscriber is not entitled to UMTS access. In response to the location update request 740, the HLR 320 sends an Insert Subscriber Data message 760 indicating by means of a SRP that UMTS access is not allowed to the MSC 310. The MSC 310 checks the access 770 by evaluating the subscription restriction information received as SRP within the Insert Subscriber Data message and rejects the location update request by sending an error information indicating 'access not allowed', i.e. indicating a roaming restriction as a reason for the rejection, both to the HLR 780 and the UE 790.

FIG. 8 shows a user-equipment controlled location update procedure for UMTS access. The user equipment (UE) 300 uses a UMTS SIM card (USIM) that stores the subscription restriction information valid for the mobile subscriber. The UE requests UMTS access by sending a Location Update 'USIM' request 820 to the MSC 310 (or SGSN accordingly). The location update request comprises a subscription restriction information, preferably by means of a subscription restriction parameter SRP, which is evaluated by the MSC 310 (or SGSN). Afterwards, the MSC 310 (or SGSN)

performs the requested location update and acknowledges it by means of a Location Update Response message 830 to the UE 300.

Without being limited to, the invention can be used preferably in all communications systems as defined by 3GPP in the release 99 as well as in all future releases thereof. In particular, this includes UMTS networks, core networks, GSM networks and the corresponding user equipment, as well as Wireless LANs and Bluetooth™ networks and user equipments.

The invention claimed is:

1. Method of performing for a mobile subscriber a location update procedure in a mobile communications system having at least one first communications service domain of a first access network type and at least one second communications service domain that belongs to a second access network type different to the first access network type, wherein the mobile subscriber is allowed to access said first communications service domain, and wherein a location update request is received at a network element of the communications system comprising the steps of:
    receiving a subscription restriction information at the network element wherein said subscription restriction information indicates at least one access network type that is an allowed access network type and that applies for the mobile subscriber;
    evaluating the subscription restriction information; and
    performing the location update procedure depending on the evaluation of said subscription restriction information.

2. Method according to claim 1, wherein a location update is performed if the evaluation of the subscription restriction information indicates that an accessing of the second communications service domain is allowed for the mobile subscriber.

3. Method according to claim 1, wherein the location update request is rejected if the subscription restriction information evaluation indicates that an accessing of the second communications service domain is not allowed for the mobile subscriber.

4. Method according to claim 3, wherein an error information is sent in response to the location update request if the request is rejected, said error information indicating an access restriction as a reason for the rejection.

5. Method according to claim 1, wherein the subscription restriction information is received within the location update request sent from a user equipment of the mobile subscriber.

6. Method according to claim 1, wherein subscriber data information is requested from a home subscriber data register, and wherein the subscription restriction information is received within subscriber data information sent from the home subscriber data register.

7. Method according to claim 1, wherein the subscription restriction information comprises a frequency band restriction information indicating a frequency band restriction.

8. Method according to claim 1, wherein the subscription restriction information comprises a public land mobile network type restriction information indicating a public land mobile network restriction.

9. Network element for performing for a mobile subscriber a location update procedure in a mobile communications system having at least one first communications service domain of a first access network type and at least one second communications service domain that belongs to a second access network type different to the first access network type wherein the mobile subscriber is allowed to access said first communications service domain, wherein the network element comprises means for receiving a location update request, and wherein the network element further comprises:
    means for receiving a subscription restriction information, wherein said subscription restriction information indicates at least one access network type that is an allowed access network type and that applies for the mobile subscriber;
    means for evaluating the subscription restriction information; and
    means for performing the location update procedure depending on the evaluation of said subscription restriction information.

10. Network element according to claim 9, wherein the means for performing the location update procedure comprises means for selectively performing the location update if the evaluation of the subscription restriction information indicates that an accessing of the second communications service domain is allowed for the mobile subscriber.

11. Network element according to claim 9, comprising means for rejecting the location update request if the subscription restriction information evaluation indicates that an accessing of the second communications service domain is not allowed for the mobile subscriber.

12. Network element according to claim 11, comprising means for sending an error information in response to the location update request if the request is rejected, said error information indicating an access restriction as a reason for the rejection.

13. Network element according to claim 9, wherein the means for receiving the location update request comprises means for receiving the subscription restriction information.

14. Network element according to claim 9, comprising means for requesting subscriber data information from a home subscriber data register, and means for receiving the subscription restriction information within subscriber data information sent from the home subscriber data register.

15. Network element according to claim 9, wherein the subscription restriction information comprises a frequency band restriction information indicating a frequency band restriction.

16. Network element according to claim 9, wherein the subscription restriction information comprises a public land mobile network type restriction information indicating a public land mobile network restriction.

17. Network element according to claim 9, wherein the network element is a Mobile Services Switching Centre.

18. Network element according to claim 9, wherein the network element is a Serving GPRS Support Node.

* * * * *